United States Patent
Jou et al.

(10) Patent No.: US 6,957,244 B2
(45) Date of Patent: Oct. 18, 2005

(54) REDUCED-WIDTH LOW-ERROR MULTIPLIER

(75) Inventors: Shyh-Jye Jou, Chung-Li (TW); Hui-Hsuan Wang, Chung-Li (TW)

(73) Assignee: National Science Council, Taipei (TW)

(*) Notice: Subject to any disclaimer, the term of this patent is extended or adjusted under 35 U.S.C. 154(b) by 519 days.

(21) Appl. No.: 09/861,555

(22) Filed: May 22, 2001

(65) Prior Publication Data

US 2002/0032713 A1 Mar. 14, 2002

(30) Foreign Application Priority Data

Jan. 31, 2001 (TW) .......................... 90102114 A

(51) Int. Cl.[7] .............................. G06F 7/52; G06F 7/38
(52) U.S. Cl. ...................................... 708/628; 708/550
(58) Field of Search .............................. 708/625, 628, 708/550–551

(56) References Cited

U.S. PATENT DOCUMENTS 6,161,119 A * 12/2000 Gabriel et al. .............. 708/551
6,167,419 A * 12/2000 Saishi et al. ................ 708/620
6,298,368 B1 * 10/2001 Miller, Jr. ................... 708/550

OTHER PUBLICATIONS

Jer Min Jou et al., "Design of Low–Error Fixed–Width Multiliers for DSP Applications", *IEEE Transactions On Circuits and Systems–II: Analog and Digital Signal Processing*, vol. 46, No. 6, Jun. 1999; and.

Sunder S. Kidambi et al., "Area-Efficient Multipliers for Digital Signal Processing Applications", *IEEE Transactions On Circuits and Systems–II: Analog and Digital Signal Processing*, vol. 43, No. 2, Feb. 1996.

* cited by examiner

*Primary Examiner*—Tan V. Mai
(74) *Attorney, Agent, or Firm*—Johnson, Lin & Associates, PC; Chauncey B. Johnson, Esq.

(57) ABSTRACT

This invention discloses a reduced-width, low-error multiplier that can be used in Digital Signal Processing (DSP). Specifically, this invention relates to a reduced-width, low-error multiplier capable of processing digital signals of communication systems such as a timing recovery circuit, a carrier recovery circuit, and a FIR filter, etc. This invention derives a binary compensation vector to compensate for the error caused by the reduction of area without any hardware overhead, and implements the compensation structure of an Array and a Booth multiplier to reduce hardware complexity.

16 Claims, 17 Drawing Sheets

```
                    X4   X3   X2   X1   X0  = X( 104 )
                    Y4   Y3   Y2   Y1   Y0  = Y( 100 )
               ─────────────────────────────────────────
           X                X4Y0 X3Y0 X2Y0 X1Y0 X0Y0
                       X4Y1 X3Y1 X2Y1 X1Y1 X0Y1
                  X4Y2 X3Y2 X2Y2 X1Y2 X0Y2
             X4Y3 X3Y3 X2Y3 X1Y3 X0Y3
        X4Y4 X3Y4 X2Y4 X1Y4 X0Y4
   ─────────────────────────────────────────────────────
   PD_9 PD_8 PD_7 PD_6 PD_5 PD_4 PD_3 PD_2 PD_1 PD_0
   PD_9 PD_8 PD_7 PD_6 PD_5 PD_4   0    0    0    0   ( 202 )
```

Figure 2

REDUCED-WIDTH LOW-ERROR MULTIPLIER

BACKGROUND OF THE INVENTION

1. Field of the Invention

This invention reveals a reduced-width multiplier capable of minimizing errors. Specifically, this invention relates to a reduced-width multiplier capable of processing digital signals of communication system such as a timing recovery circuit, a carrier recovery circuit and a FIR filter.

2. Description of the Related Prior Art

In the face of the recent fast progress in communication, computation methods have become more complicated. The demand for multipliers is escalating, and efficient multiplier design is deemed important. A currently important topic is how to design a multiplier characterized by low power and area-saving, while meeting the requirements of integrated circuit design and its applications.

The operation of a multiplier is basically the expansion of a multiplicand(104), according to the value of a multiplicator (100), resulting in a parallelogram as shown in FIG. 1. The construction involves several steps. Expand a multiplicand(104) in accordance with a multiplicator(100), arrange them by positional weight, and finally add up all the values found in the summation row to produce a product (105). The summation row includes two parts, i.e. the sum of low bits (LP, 101) and the sum of high bits(MP, 102). If a multiplicand X has a bit length of m, and a multiplicator Y has a bit length of n, then the product PD will have (m+n) bits. With regards to the application of digital communication, the bit number (m+n−p) required by a product is not necessarily (m+n), but some where in between max(m,n) and(m+n). The bit number required by a product also depends on area, computation speed and performance required by the system, such as signal-to-noise ratio (SNR), and bit error ratio (BER), etc. In general, the first (m+n−p) bits are taken and constitute the most significant bits. As illustrated in FIG. 1, this invention uses p=n, and error arises between the value obtained by taking (m+n−p) bits and the value resulting from taking (m+n) bits.

Therefore, this invention tackles the existing difficulties associated with saving area space while reducing errors. As far as the (m+n−p) bits we need, this invention uses the first (m+n−p) bits while assigning 0 directly to the lower P bits without any computation, when it comes to Integer fixed-point; or it simply takes the first (m+n−p) bits generated by this invention when fractional fixed-points are involved.

Amongst existing integrated circuit designs, Array and Booth multipliers are commonly used when it comes to fast computation. With regards to signal processing in digital communication, the bit length of a product term is reduced and determined in response to the SNR required by the system. When the bit number of the product is decreased, the computation required is also reduced. At present, there are four types of technology in this regard. FIGS. 2 to 5 illustrate the four methods, using an example of 5×5 with product of six bit integers (m=n=5, p=4).

FIG. 2 illustrates method 1 or a Rounded Method. Calculation is done on all product terms (202) up to (m+n) bits. After that, the results between the $PD_{(m+n-1)}$ bits and the $PD_p$ bits are reserved. This is also known as a Truncated Method. Alternatively, a Rounded Method could be used, which includes rounding off the $PD_{(p-1)}$ term of the result, and adding it to the preceding term. This method is generally adopted by most systems. Complete computation followed by truncation will yield a result, and the error between the result and the original product will be smaller. However, truncating a great amount of product terms which have undergone all of the computation not only waste computation time, but also waste the computational hardware area.

FIG. 3 illustrates method 2 which involves truncation followed by computation. Unlike method 1, this method involves truncating the bit number of a multiplicand and a multiplicator, so as to conform with the requirement of the system regarding the bit number of product (302). After truncation, the multiplicand and the multiplicator will undergo computation in a traditional multiplier. For example, if both the multiplicator(100) and the multiplicand (104) consists of five bits respectively, while the system requires six bits, they will be truncated to three bits respectively. In other words, a 5×5 multiplier is reduced to a 3×3 multiplier, in order to decrease the area. The drawback of this method is that, the bits of a multiplicator and a multiplicand are truncated before computation, leading to the removal of those multiplicators or multiplicands located in relatively higher weighting positions, such as X1Y4, X4Y1 . . . (301) and therefore yielding a great error.

FIG. 4 illustrates method 3, which involves compensation with a fixed value. In view of the error derived from truncating operation units of relatively low bits, the product is compensated with a fixed value. In this computation, the value to be removed is always found behind the bit of the product term to be removed. The fixed value of compensation is a result of the statistics conducted on the bit number of multiplicator (100)s and multiplicands (104)s. Good examples of this kind are found in the content of U.S. Pat. No. 4,598,382 and in Kidambi, S. S. *et al.* (IEEE Transactions on Circuits and Systems II, Vol. 43, No. 2, pp. 90–95,1996). Its underlying theory is that a certain bit length always yields a certain error, and hence it figures out a product (403) by adding in a fixed value. The example in FIG. 4 uses a fixed compensation value (402) of 1. The error produced in this method is smaller than that in method 2, which involves truncation prior to compensation. This method also reduces computation and hardware area. However, due to the fact that a fixed compensation value independent of the multiplicand or the multiplicator is added to the product, the error may still be large. For instance, if both the multiplicator and the multiplicand are 0, then the product will be zero. However, this method will still compensate the product with a fixed value. Thus, although the average error of this method will be smaller than that produced by truncation followed by computation, considerable errors will still exist in the product for some cases.

FIG. 5 illustrates method 4 which involves compensation with an adaptive value. Jou, J. M. *et al.* (IEEE Transactions on Circuits and Systems II, Vol. 46, No. 6, pp. 836–842, 1999) figured out a compensation method wherein the value added to the product term depends on the distribution of the input signals of the multiplicator (100) and the multiplicand (104). This method yields an average error or an individual error much smaller than that of method 3 (compensation of fixed value). Nevertheless, Jou, J. M. *et al.* did not completely take into account the distribution of input signals and the distribution of the intended compensation, leading to a surplus of hardware area in the compensating circuit as well as unnecessary power consumption.

This invention keeps all the merits of the above circuits and creates an innovative compensating circuit. It reduces not only power consumption due to the reduction of computation and hardware, but it also generates a post- compensation product with error smaller than that found in the design of Jou, J. M. et al.

SUMMARY OF THE INVENTION

An object of the present invention is to disclose a reduced-width, low-error multiplier that generates small errors and allows reduction of bit length.

Another object of this invention is to disclose a reduced-width, low error multiplier capable of being used in processing digital signals of a communication system.

Still, another object of this invention is to disclose a reduced-width, low error multiplier capable of drastically reducing complexities associated with a multiplier's circuit.

Yet still, another object of this invention is to disclose a reduced-width, low error multiplier with an innovative compensation vector signal which compensates for the errors made as a result of saving area or space.

Still further, an object of this invention is to disclose a reduced-width, low error multiplier capable of applying the concept of an innovative compensation vector signal to an Array and a Booth multiplier.

A final object of this invention is to disclose a reduced-width, low error multiplier with a hardware structure capable of enhancing area-saving mechanism.

In order to provide an understanding of the principles associated with the present invention, reference will now be made to the embodiments illustrated in the drawings and specific language will be use to describe the same. However, no limitations of the scope of the invention is hereby intended. Thus, any alteration and modifications of the inventive features illustrated herein and any additional application of the principle of the present invention as illustrated herein which would normally occur to one skill in the relevant art and having possession of this disclosure are to be considered within the scope of the present invention described herein.

BRIEF DESCRIPTION OF THE DRAWINGS, REFERENCES AND RELATED TABLES

Table 1 shows the coding method of the Booth multiplier.

Table 2 shows the probability distribution of $\alpha_{n-1}=\beta-1$, $\beta$ or $\beta+1$ with different bit numbers (n).

Table 3 shows the evaluation and performance of the Array multiplier.

Table 4 shows the evaluation and performance of the Booth multiplier.

FIG. 2 is a diagrammatic illustration of method 1.

Figure 10:
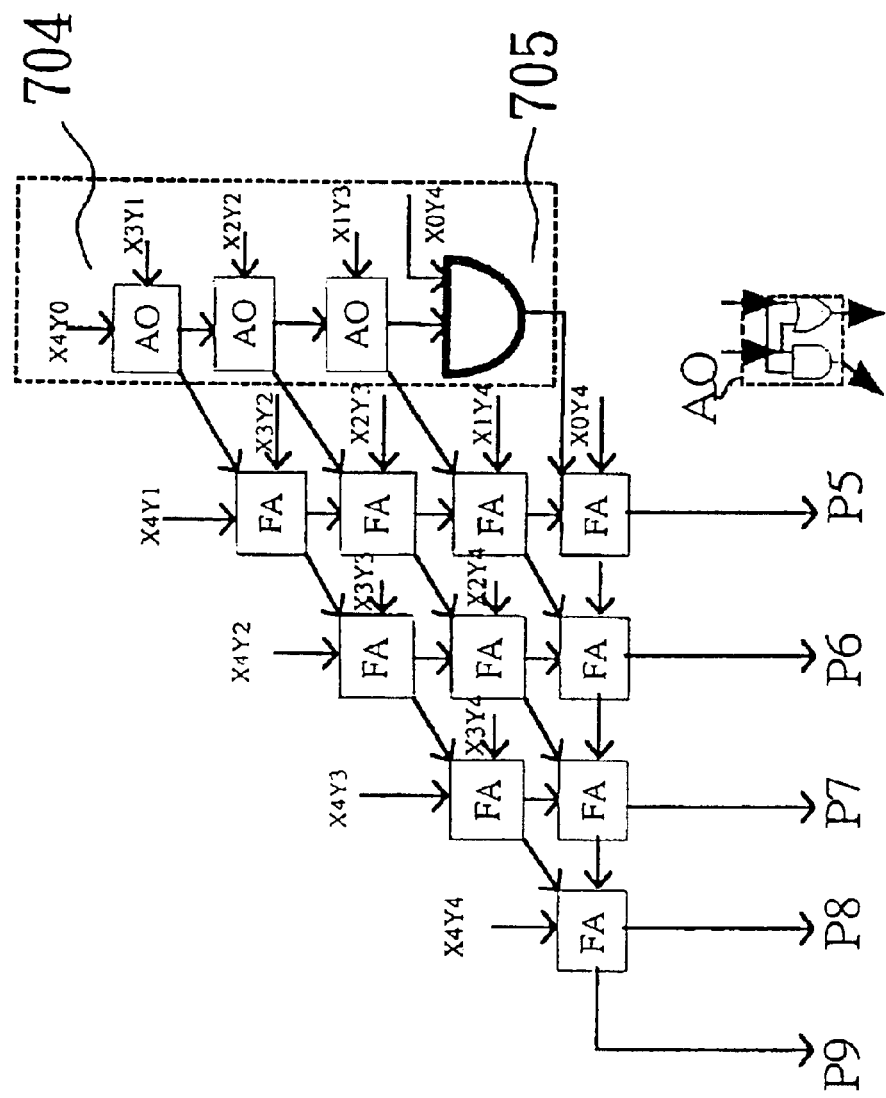

FIG. 10 is an illustration of the J. M. Jou Array multiplier and its compensation circuit(5×5 to 5).

Figure 11:
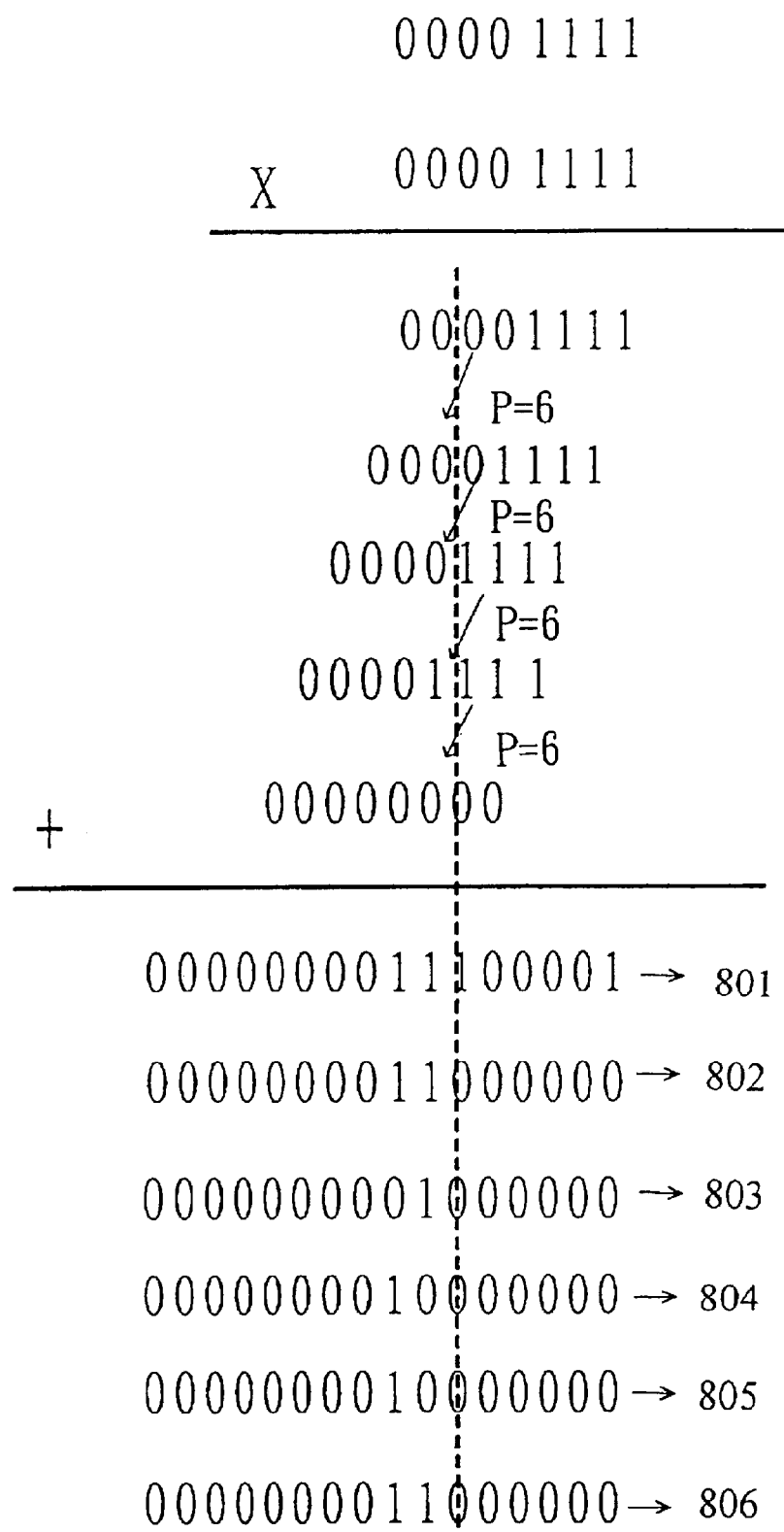

FIG. 11 is an illustrative example of the reduced-width Array multiplier with 8×8 to 10.

Figure 12:
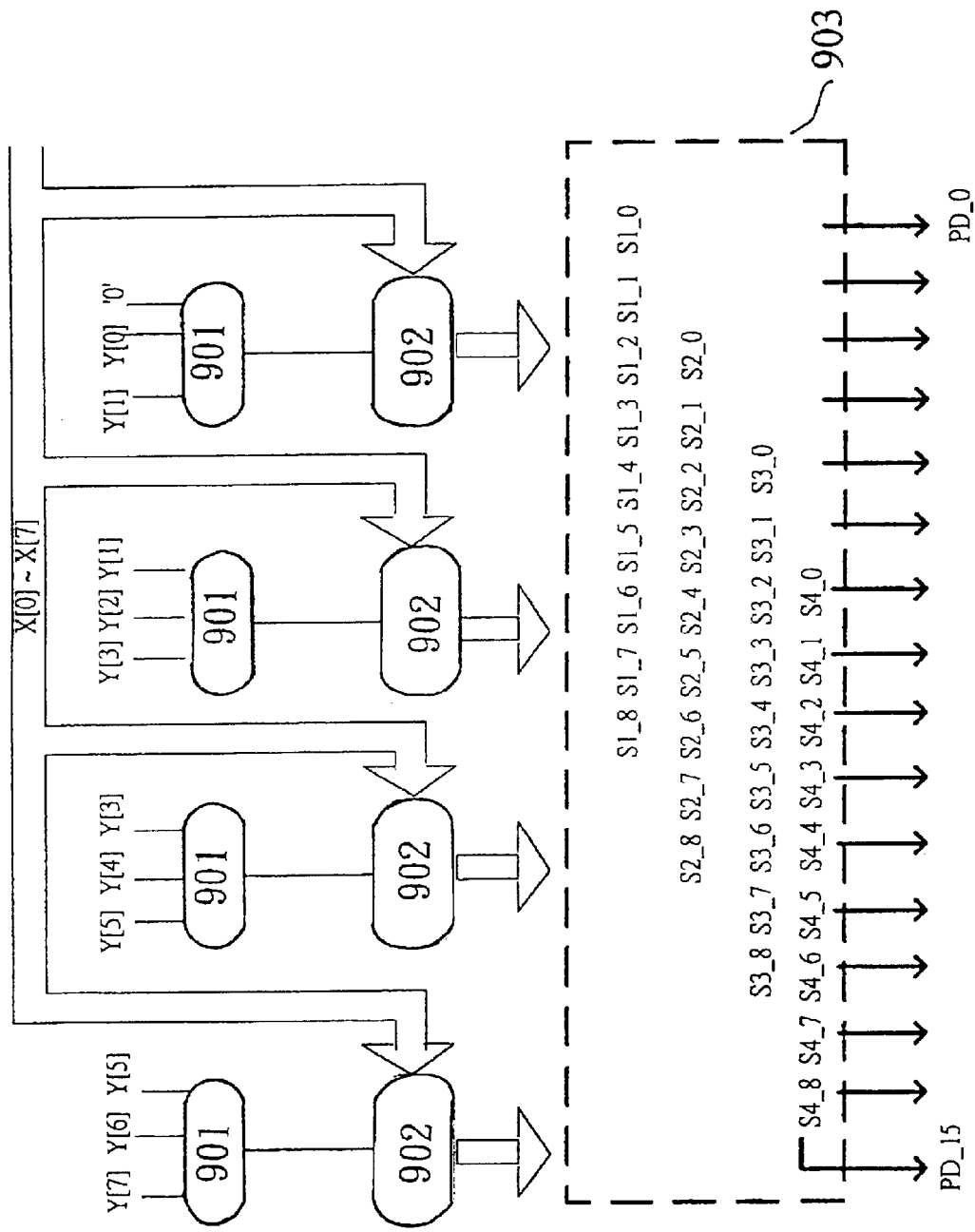

FIG. 12 is a diagrammatic illustration of the Booth multiplication of 8×8 to 16 of the two complement systems.

Figure 13:
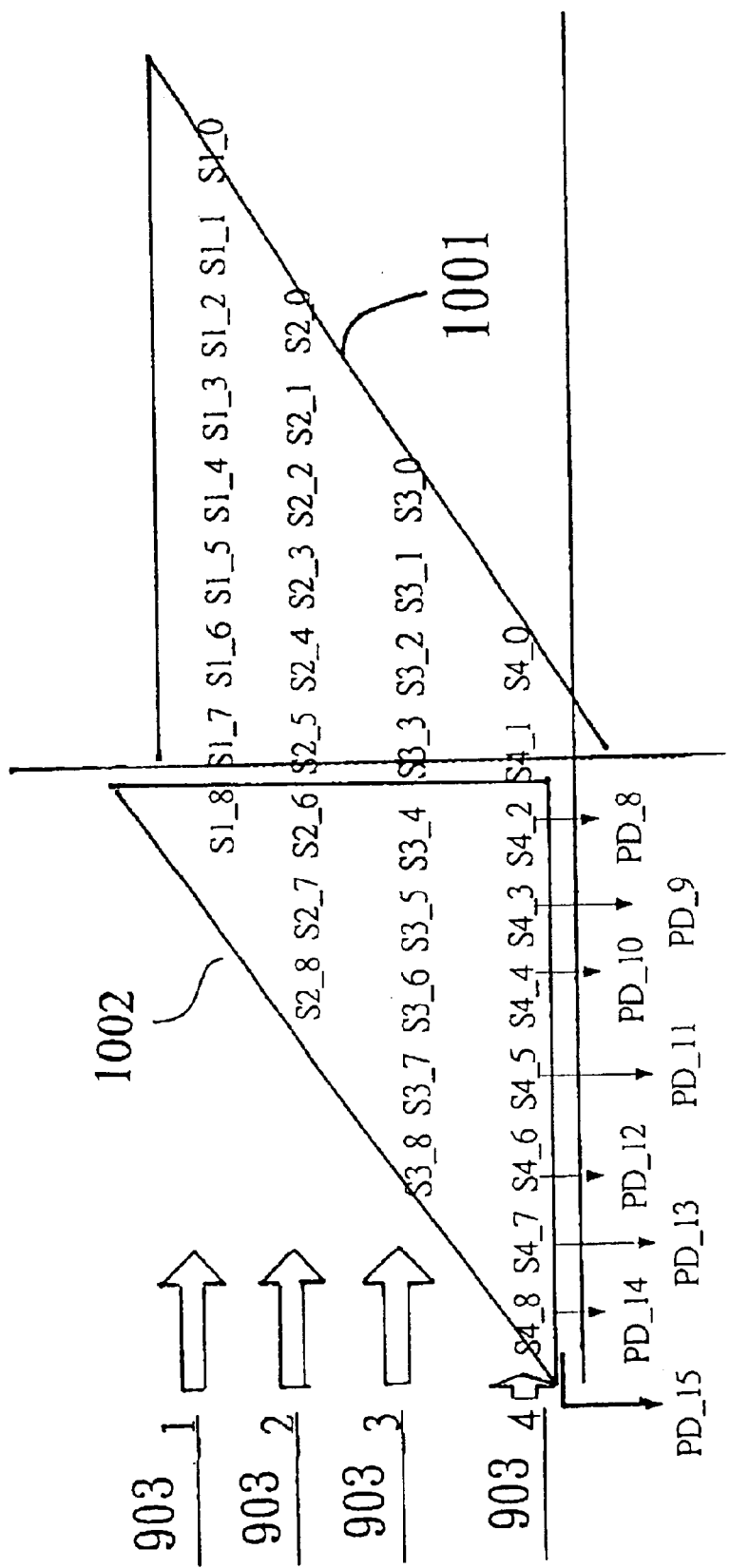

FIG. 13 is an illustration of the Summand operation of the acquired Booth multiplication of 8×8 to 8.

Figure 14:
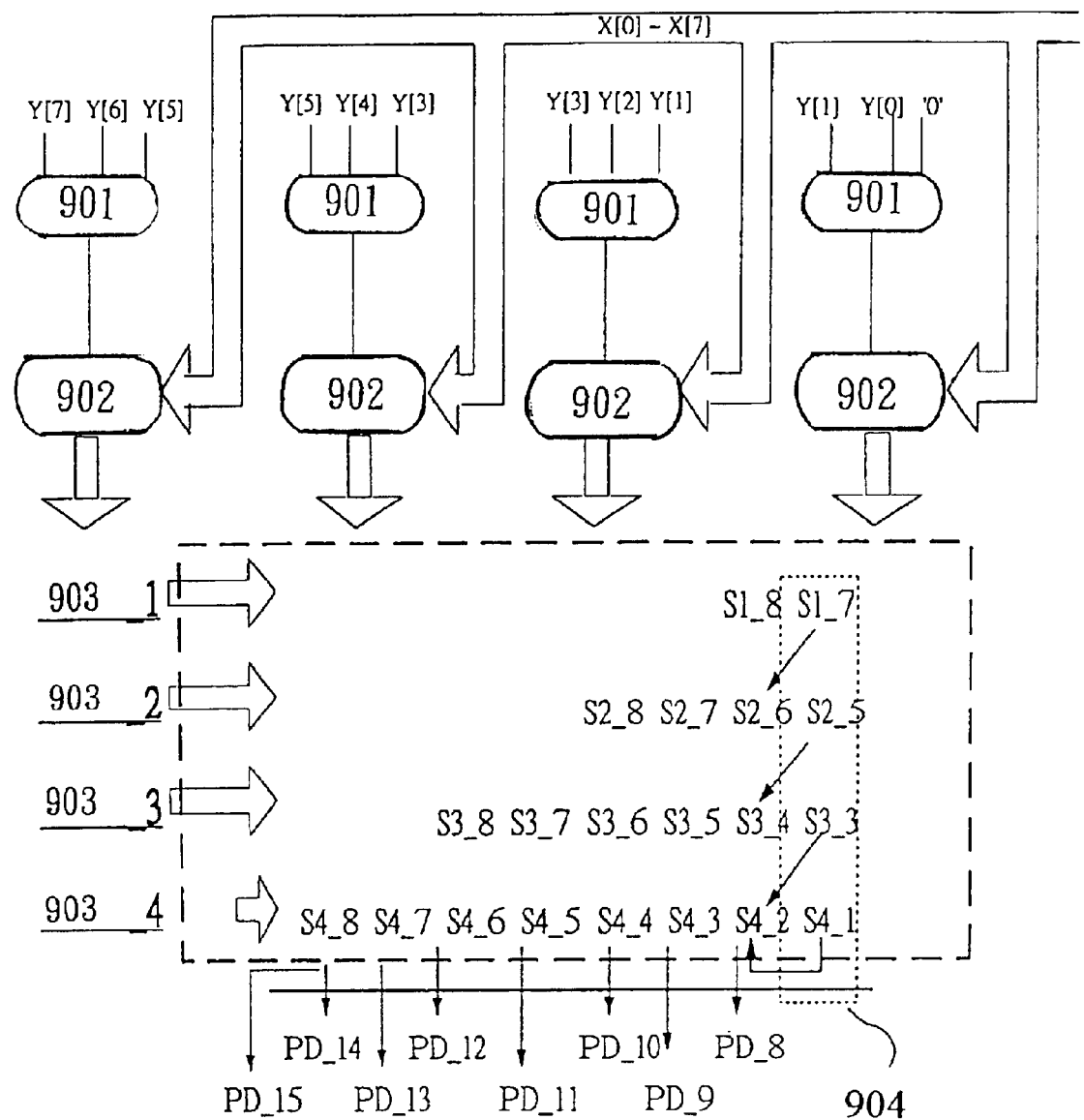

FIG. 14 is a diagrammatic illustration of the reduced width Booth multiplication operation and its compensation terms in 8×8 to 8.

Figure 15:
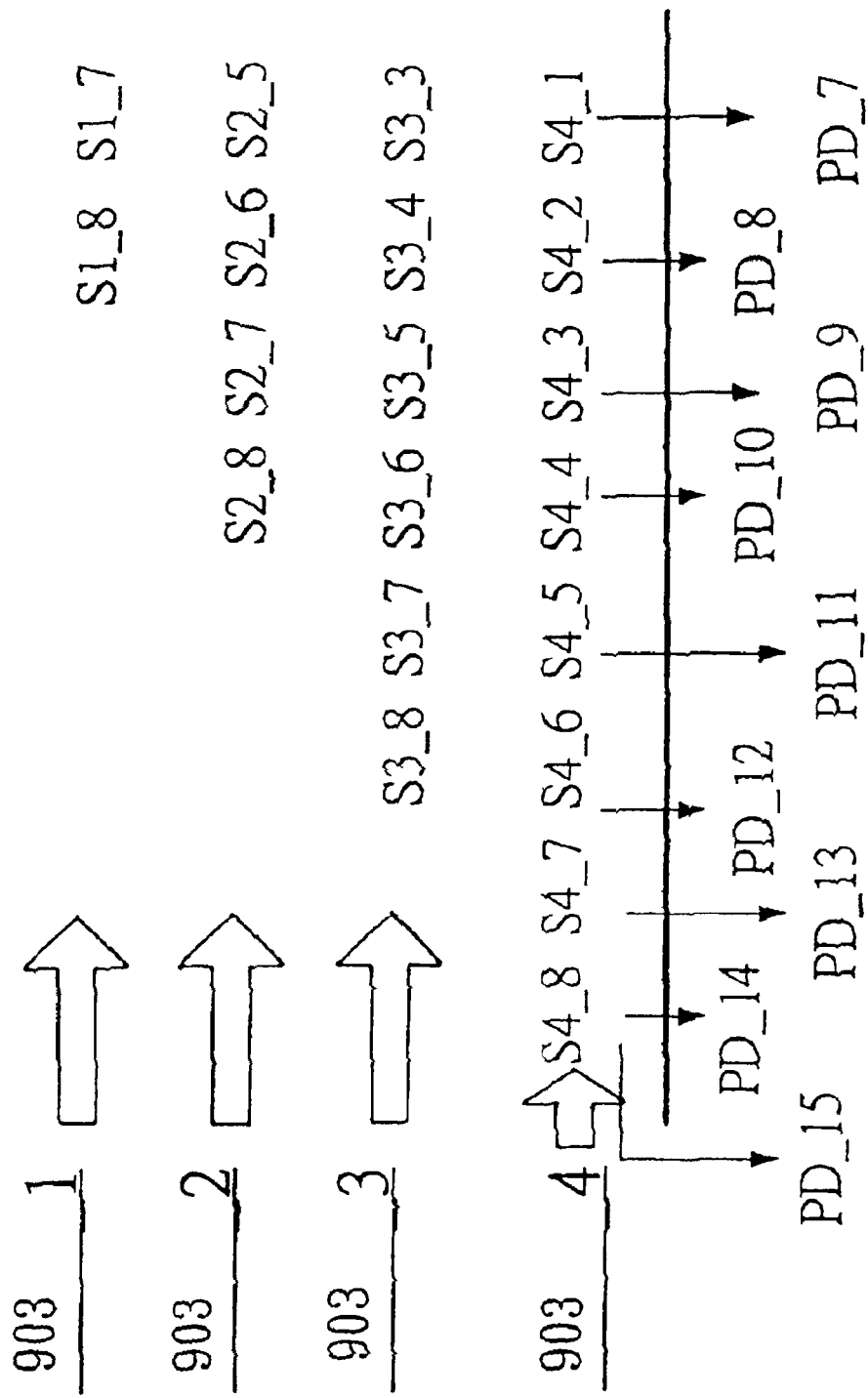

FIG. 15 is an illustration of the method of operation of the summand when the bit number is n+1.

Figure 16:
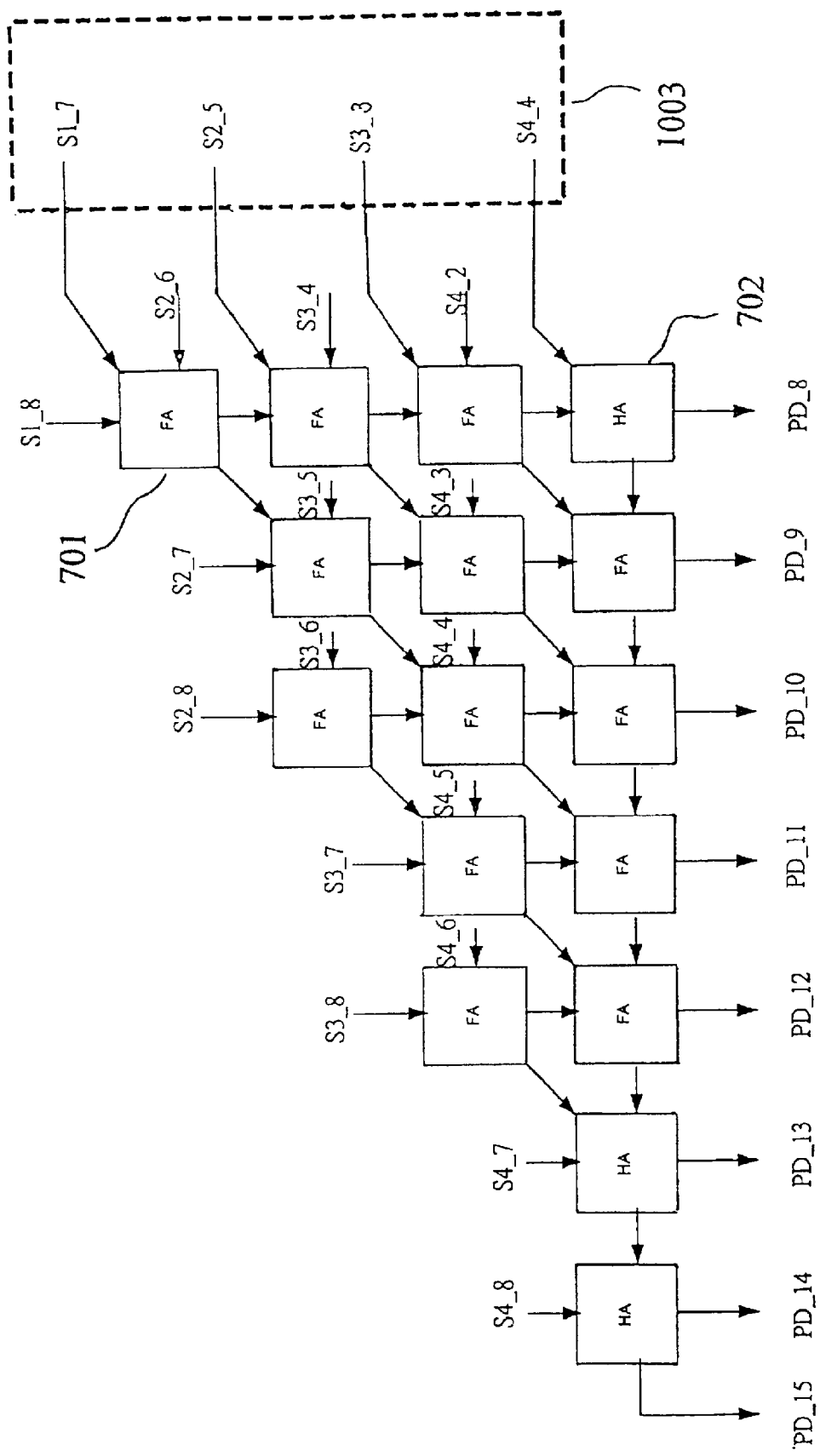

FIG. 16 is an illustrative example of the circuit of the summand row processing unit of the reduced-width Booth multiplier.

Figure 17:
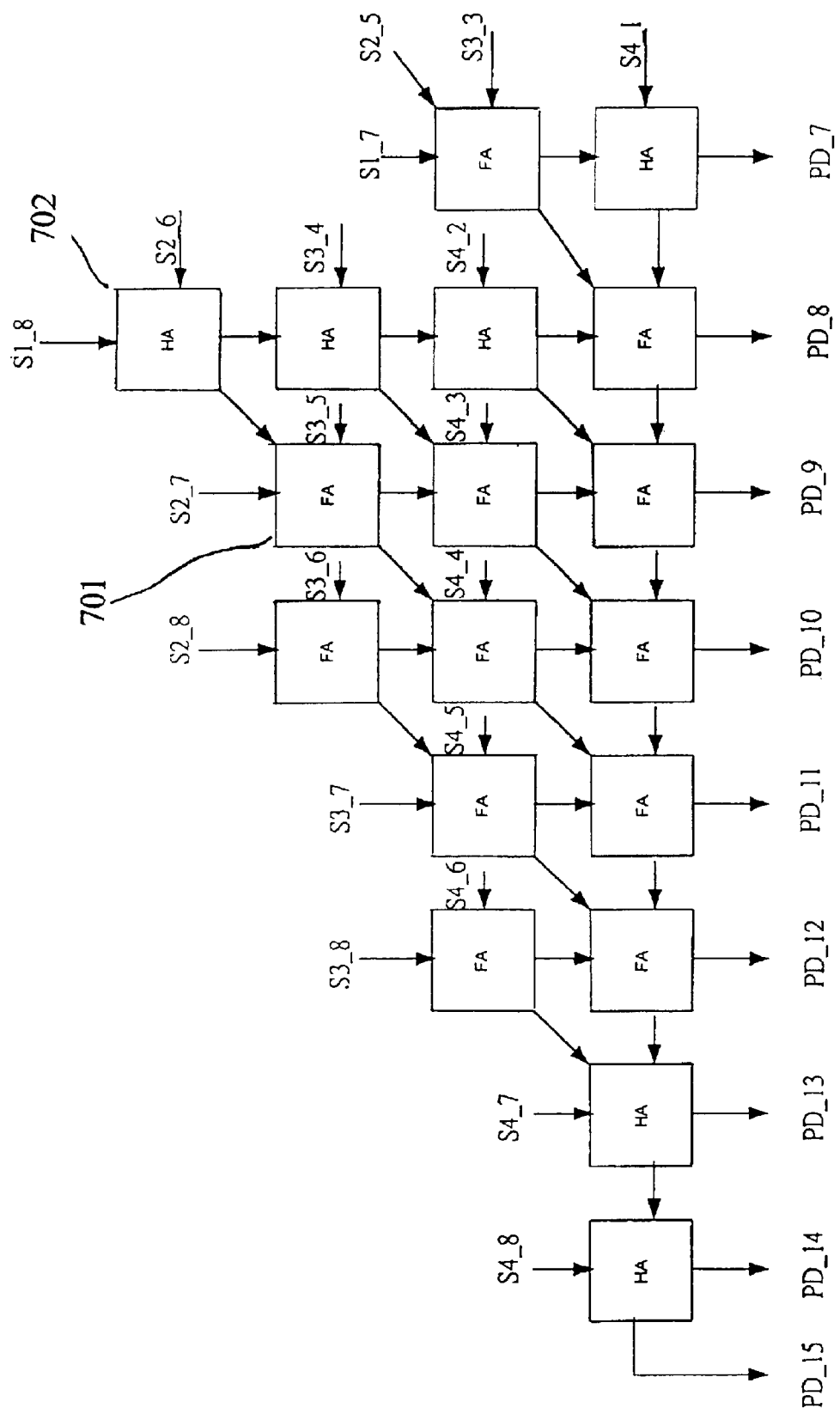

FIG. 17 is an illustrative example of the circuit of the summand processing unit of the Booth multiplier of n+1 bits.

Reference numbers of the aforementioned drawings:

100 . . . multiplicator(100);
101 . . . the summand of low bits (LP);
102 . . . the summand of high bits (MP);
104 . . . multiplicand(104);
105 . . . product (105);
202 . . . the product arises from method 1;
301 . . . the operation removed;
401 . . . the operand of low bits to be removed;
402 . . . fixed compensation;
501 . . . the compensation number relevant to a removed portion;
601 . . . the removed portion of lower part of summand;
603 . . . the product of a reduced-width, lower-error multiplication;
604 . . . the reserved portion of higher part of summand
701 . . . Full-Adder (FA);
702 . . . Half-Adder (HA);
703 . . . the proposed compensation terms and circuit for minimizing error;
704 . . . the AND-OR(AO) gate used in method 4;
705 . . . the AND used in method 4;
801 . . . the value of a complete product;
802 . . . the product acquired by method 1;
806 . . . the product acquired by this invention;
901 . . . coder;
902 . . . scaler;
903 . . . the operation of the summand;
904 . . . the compensation number relevant to the removed part;
1001 . . . the portion of lower bits intended for removal;
1002 . . . summand row with non-truncated operation and higher bits; and
1003 . . . the compensation number relevant to the removed part.

DETAILED DESCRIPTION OF THE INVENTION

This invention's Reduced-Width, Low-Error Multiplier reveals a kind of multiplication operation and basic structure that yields small errors and permits reduction of product terms. It can be applied to the design of multipliers for processing digital signals of a communication system.

If a multiplicand X (104) has a bit length of m and is denoted by $X_{m-1} \ldots X_i \ldots X0$, and a multiplicator Y (100)

has a bit length of n and is denoted by $Y_{n-1} \ldots Y_j \ldots Y0$, then the product PD (105) will have (m+n) bits and is denoted by $PD_{m+n-1} \ldots PD_n \ldots PD0$ where i is the ith bit of a multiplicand X and j is the jth bit of a multiplicator Y.

Figure 6:
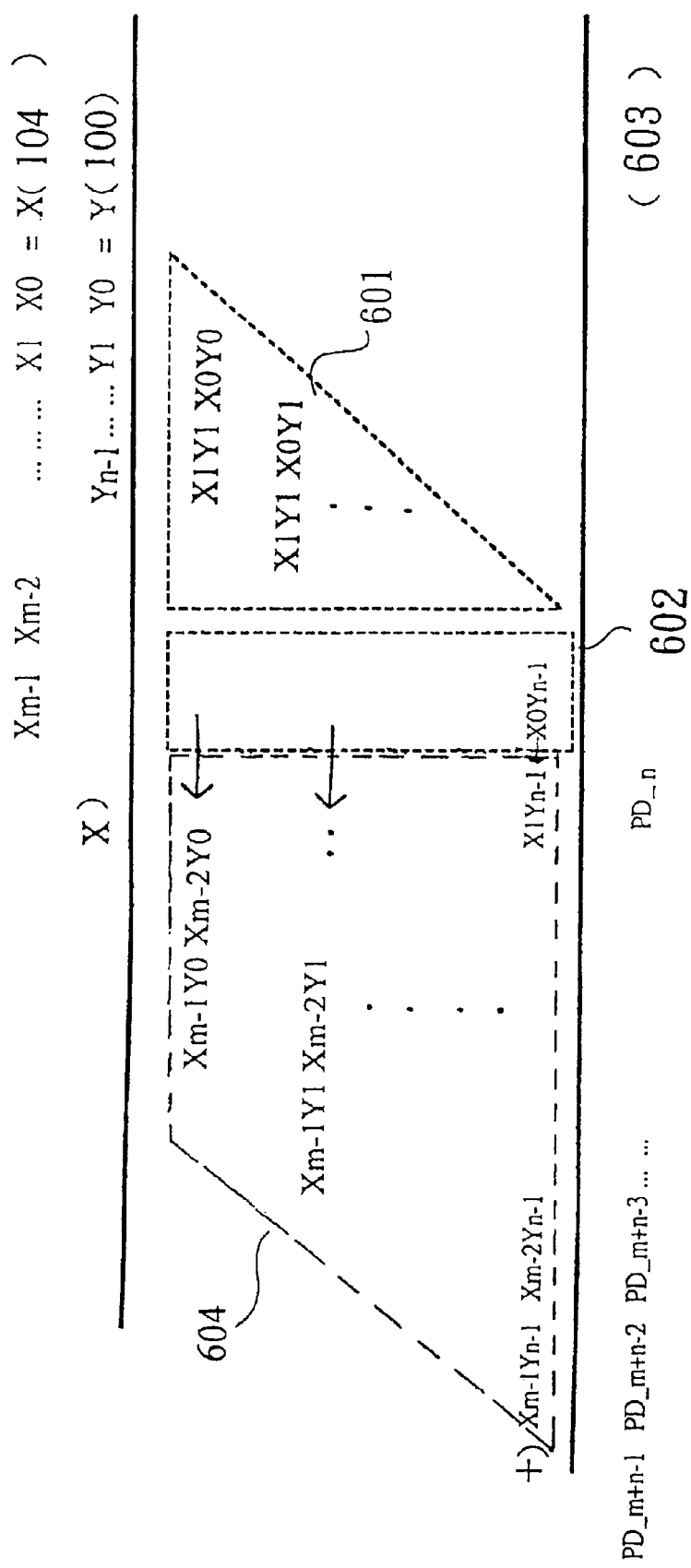
FIG. 6 is a diagrammatic illustration of the operation of the reduced-width multiplier of this invention.

With regards to a reduced-width multiplier operation, as illustrated in FIG. 6, a multiplicand X (104) has a bit length of m, and a multiplicator Y(100) has a bit length of n, and the product term PD(105) needs a bit number of (m+n−p) where p is the bit length of the product term to be removed. This invention will remove the operation that involves a bit number less than required, such as the lower portion (LP, 601) of the summand as indicated in FIG. 6. As illustrated in FIG. 6, this invention uses p=n and makes proper compensation in accordance with the values of the multiplicator (100) and the multiplicand (104). The compensation signal (602) is β, which is the sum of $x_i y_j$, when i+j=p−1.

$$\beta = \sum_{i+j=p-1} x_i y_j = x_{p-1} y_0 + x_{p-2} y_1 + \ldots + x_1 y_{p-2} + x_0 y_{p-1}$$

Add the value of β to the vertical column found at the end of the right-hand side of the higher part of summand (604). The consequence of the addition is the formation of a multiplication operation that yields a reduced-width multiplier with small error. This new reduced-width low-error multiplier has the following merits:

1. It directly eliminates the operation of the least significant bits of product (601), so that less hardware will be required for the computation, and the computation will be faster;
2. The amplitude of the compensation signals(602) of the errors varies with the multiplicator and multiplicand; and
3. The number (P) of product terms to be reduced may vary, and it requires no new structural design.

The multiplication operation method designed by this invention can be applied to Array multipliers and Booth multipliers, as well as all the operation methods compatible with this invention, so that it gives rise to a structure providing feasible functions of the same effect.

Figure 8:
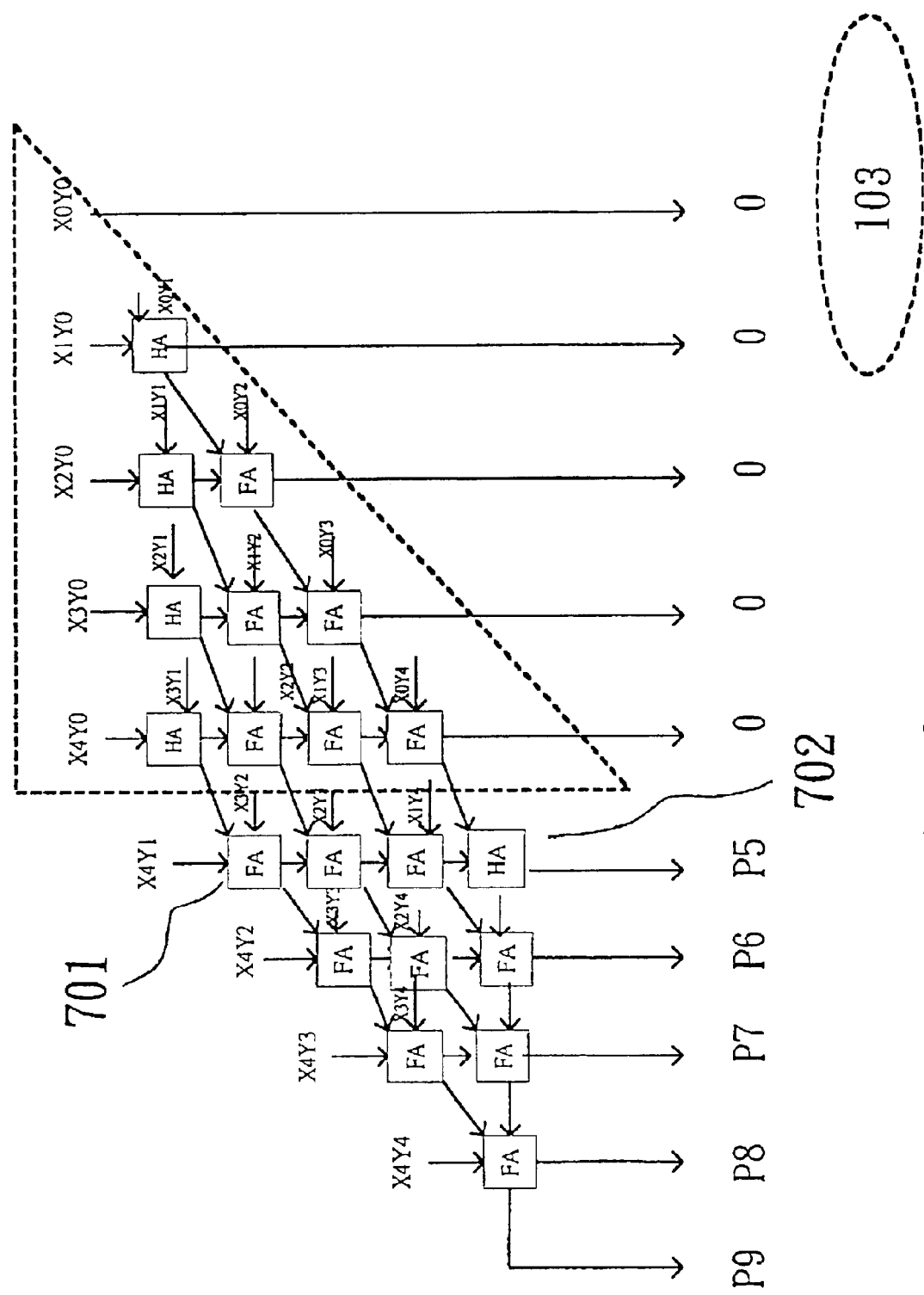
FIG. 8 is an illustration of the acquired Array multiplier of 5×5 to 5.
Figure 9:
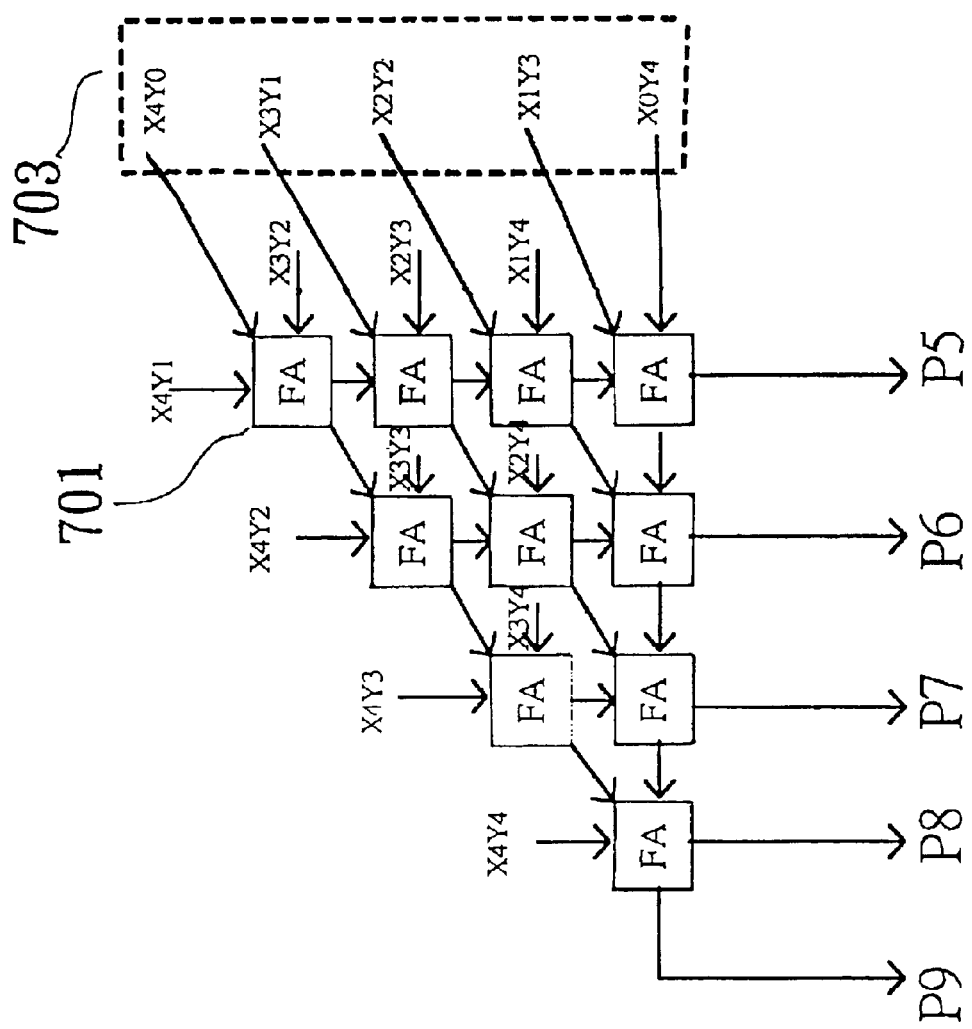
FIG. 9 is an illustration of the reduced-width Array multiplier and its compensation circuit of this invention (5×5- >5).

FIGS. 9 and 14 illustrate how reduced-width low-error multiplication is applied to Array and Booth multiplier respectively. FIG. 8 shows an conventional Array multiplier of 5×5 to 5 which includes Full-Adder (FA,701), Half-Adder (HA, 702) array and AND gate. Full-Adder takes three input bits of the same weight and generates a sum and carry bits. Half-Adder takes two input bits of the same weight and generates a sum and carry bits. AND gates are used to generate $x_i y_j$. Full-Adder (FA, 701) and Half-Adder (HA, 702) array work together to add up the values of the summand. In FIG. 8, the dotted line indicates the operation that will be removed by this invention.

FIG. 9 illustrates the circuits characterized by the reduced-width, low-error array multiplier of this invention. The circuits include Full-Adder (701), AND gate and a compensating circuit (703). The compensation signal is β, which is the sum of $x_i y_j$ when i+j=p−1.

$$\beta = \sum_{i+j=p-1} x_i y_j = x_{p-1} y_0 + x_{p-2} y_1 + \ldots + x_1 y_{p-2} + x_0 y_{p-1}$$

A new array structure for implementing the reduced-width low-error multiplier can be created by adding these compensation vectors to one of the Full-Adder located in the rightmost column. In FIG. 9, the bits outlined by the dotted line (703) is a compensation vector introduced by this invention. These bits have weight like that of P4 and equals $x_4 y_0 + x_3 y_1 + x_2 y_2 + x_1 y_3 + x_0 y_4$. The distinguishing features of the invention are that it does not require any other circuit, but only needs to add the value of β directly to one of the existing Full-Adder.

A generally acquired Booth multiplier includes a Booth Coder (901), a scaler (902) and summand processing unit. FIG. 12 shows an 8×8 to 16 Booth multiplier. In order to speed up operation and decrease the number of rows in summand, every three multiplicator bits ($Y_{j+1}$, $Y_j$, $Y_{j-1}$) are grouped as a unit to generate an addition row. The two successive units will overlap one bit. Table 1 shows the rule of grouping multiplicator bits. A multiplication by two is done by moving all the data leftward by one bit. Coder does the coding operation. Shifting and complement operations are done by a scaler means. In Booth multiplier, the number of row in summand can be reduced by 50% due to the coding operation. Taking 8×8 to 16 as an example, it decodes a multiplicand (8 bits) according to a multiplicator (8 bits) and obtains four rows (903); each row is different from the previous row in the way that the data of the former is moved leftward by two bits with respect to that of the latter. Users can acquire these four rows with whatever circuit they consider suitable, though the choice usually depends on the required operational speed.

This invention's reduced-width low-error Booth multiplier includes Booth coders, scalers, Full-Adder and Half-Adder array, and at least one compensating circuit. It is characterized by the coding of Booth coders and the shifting and complement operation with a scaler. The coding reduces the number of summand by 50%. Full-Adder takes three input bits of the same weight and generates a sum and carry bits. Half-Adder takes two input bits of the same weight and generates a sum and carry bits. The compensation signal is β, which is the bit of the (p−1) th vertical column of the original summand. Full-Adder and Half-Adder array work together to add up the values of the summand. β is added to the vertical column found at the end of the right-hand side of the reserved summand.

FIG. 14 illustrates an example of the summand processing unit of the reduced-width, low-error Booth multiplier with 8×8 to 8. This invention will remove the operation that involves bit number less than required (1001) as shown in FIG. 13. However, this invention makes proper compensation in accordance with the values of the multiplicator and the multiplicand. The compensation signal is β, which is $$\beta = S_{1\_7} + S_{2\_5} + S_{3\_3} + S_{4\_1}$$

β is added directly to the vertical column at the end of the right hand side of the reserved summand. Then the summation of the value of β and the reserved portion of the high part of the summand (1002) form the multiplication operation that yields a small error and allows the reduction of bit length.

The summand processing unit of the reduced-width 8×8 to 8 Booth multiplier works like the Array multiplier. That is, it includes a Full-Adder (FA, 701) array a Half-Adder (HA, 702) array, and a compensating circuit(1003). The overall circuit is illustrated in FIG. 16. Full-Adder takes three input bits of the same weight and generates a sum and carry bits. Half-Adder takes two input bits of the same weight and generates a sum and carry bits. Full-Adder (FA, 701) and a Half-Adder (HA, 702) array work together to add up the values of the summand. In FIG. 16, the bit outlined (1003) by the dotted line is the compensation vector introduced by this invention. Its original positional weight is $$\beta = S_{1\_7} + S_{2\_5} + S_{3\_3} + S_{4\_1}$$

β is added to one of the inputs of the Full-Adders that are located in the rightmost column. The merit of this structure is that no extra circuits are required to implement the compensation signal. This is one of the features of this invention.

TECHNICAL CONTENT AND CHARACTERISTICS

Equation 1 below represents the formula of a general multiplier. In equation 1, X denotes a multiplicand (104), Y a multiplicator (100), and PD a product term (105).

$$PD = XY = \sum_{i=0}^{m+n-1} PD_i 2^i = \left(\sum_{i=0}^{m-1} X_i 2^i\right)\left(\sum_{i=0}^{n-1} Y_i 2^i\right) \quad \text{(equation 1)}$$

Figure 1:
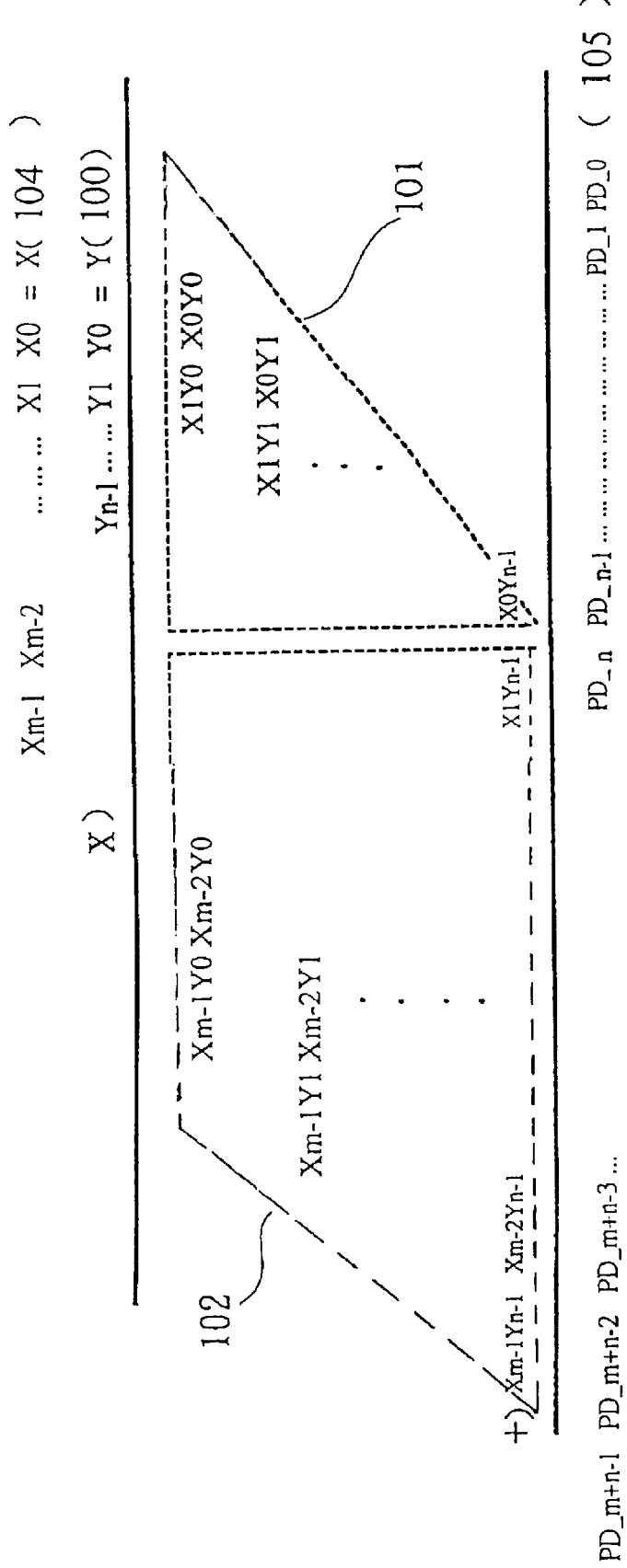
FIG. 1 is an illustration of the Operation of multiplication.
Figure 3:
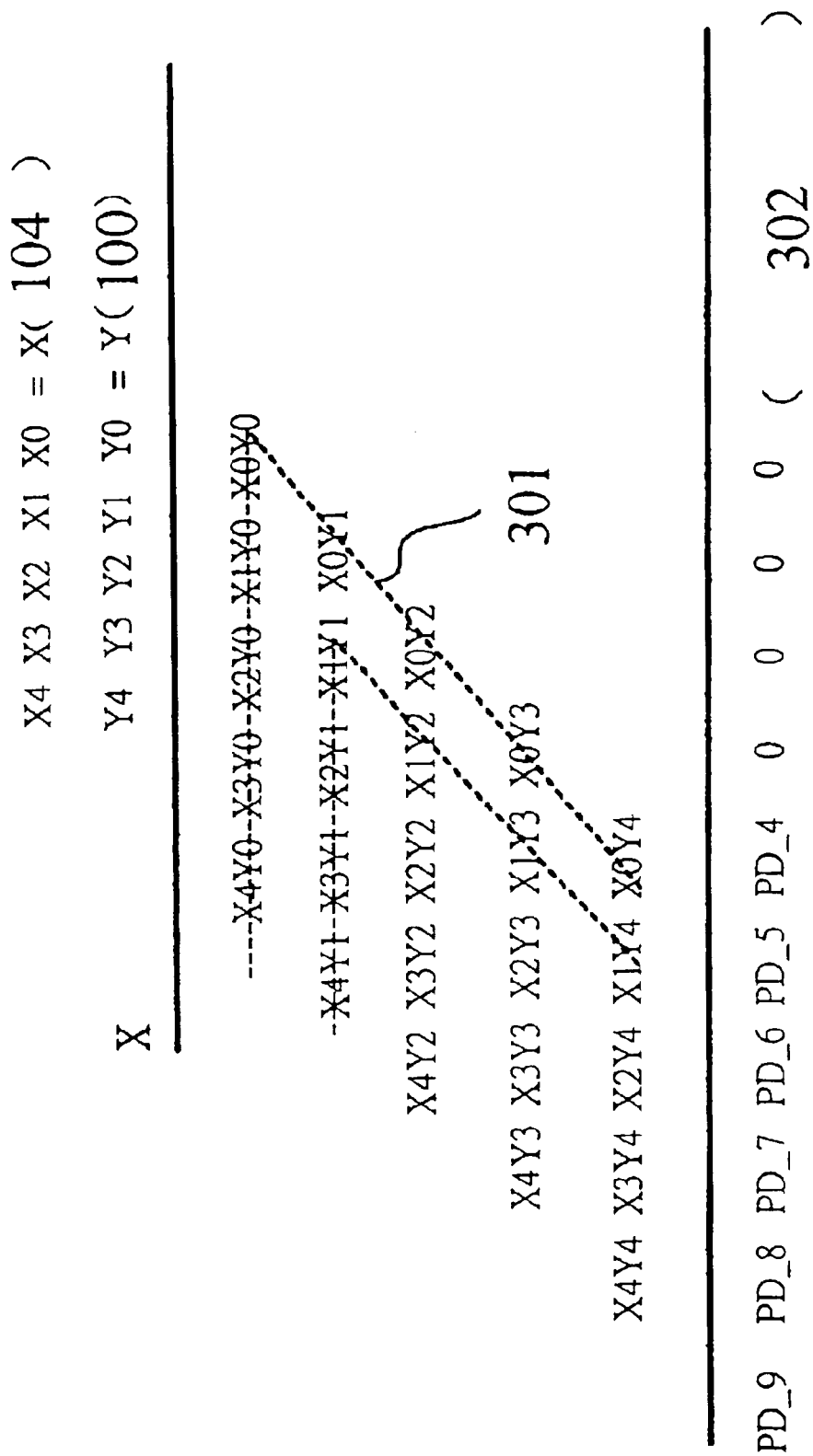
FIG. 3 is a diagrammatic illustration of method 2.
Figure 4:
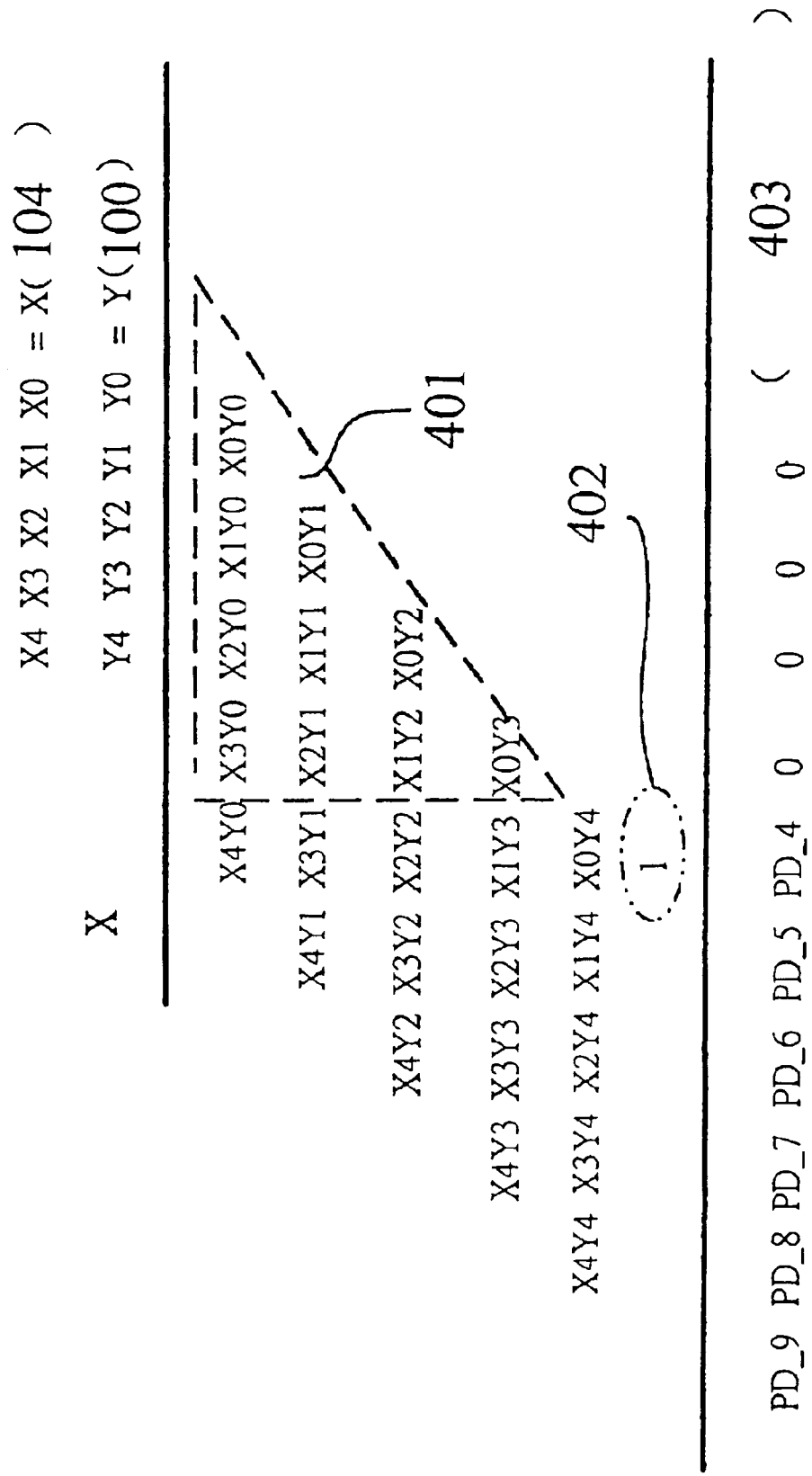
FIG. 4 is a diagrammatic illustration of method 3.
Figure 5:
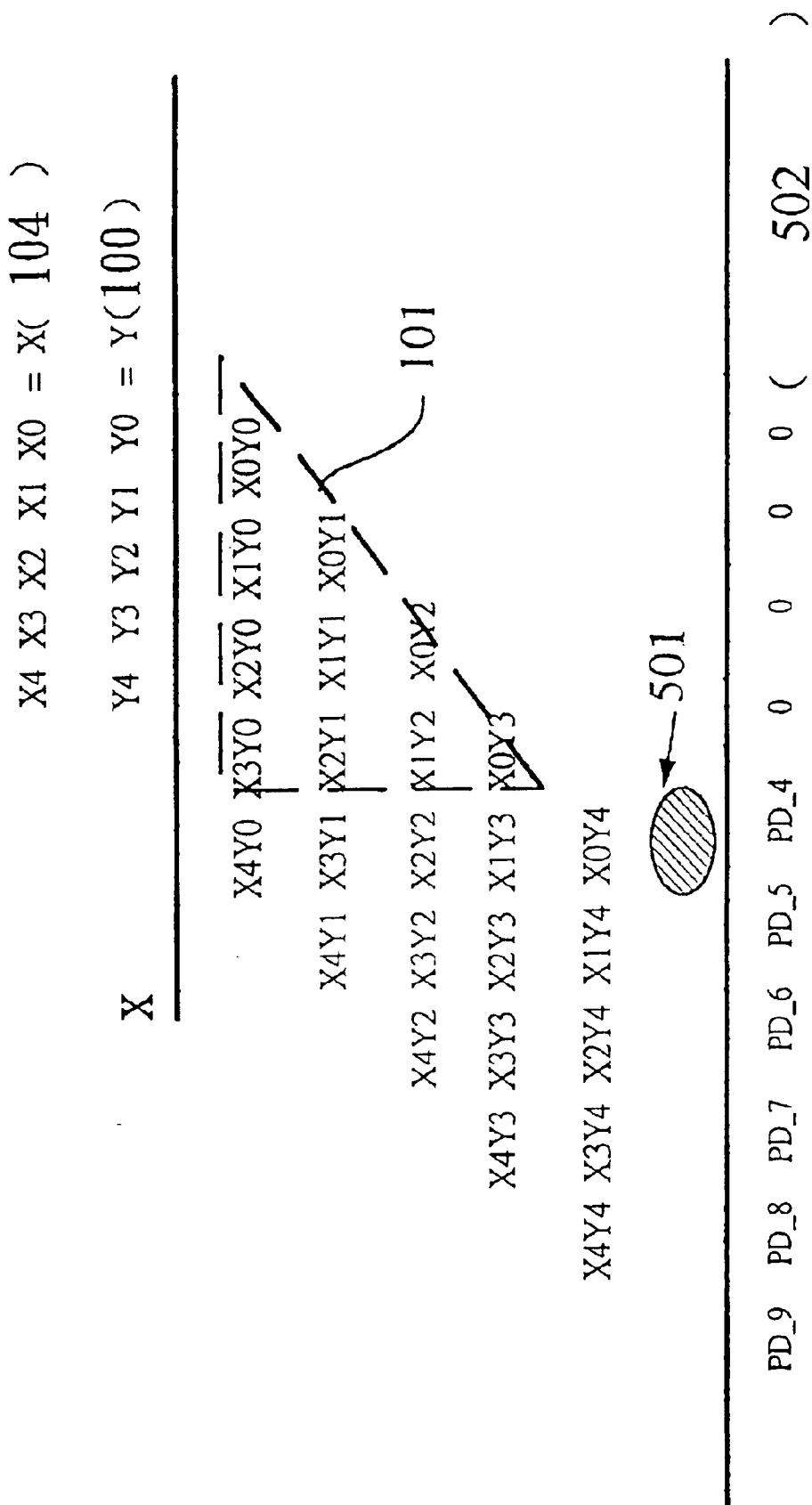
FIG. 5 is a diagrammatic illustration of method 4.

In this invention, the result of a product is divided into two parts, i.e. the sum of high bits (MP,102) and the sum of low bits (LP,101), and p denotes the number of bits that is to be truncated in the final product (105). Hence, equation 1 can be re-written as equation 2 and the operations are shown in FIG. 1 wherein it is assumed that p is equal to the number (n) of multiplicands.

$$PD = MP + LP = \sum_{i=p}^{m+n-1} PD_i 2^i + \sum_{i=0}^{p-1} PD_i 2^i \quad \text{(equation 2)}$$

In this invention, it is intended that the operation of the summand of low bits (LP,101) should be removed, and the operation of the summand of high bits (MP,102) remain intact. However, the removal of the summand of low bits (LP) operation will lead to a result quite different from the real product (105) value. By deduction, it is found that the carry from the summand of low bits (LP) to the sum of high bits (MP) is $\alpha_{p-1}$. Therefore, we need a compensation amounts which equals $\alpha_{p-1}$. According to FIG. 1, $$\alpha_{p-1} = \begin{vmatrix} \frac{1}{2}(x_{p-1}y_0 + x_{p-2}y_1 + \ldots + x_0 y_{p-1}) + \\ \frac{1}{4}(x_{p-2}y_0 + \ldots + x_0 y_{p-2}) + \\ \frac{1}{8}(x_{p-3}y_0 + \ldots x_0 y_{p-3}) + \ldots + \frac{1}{2^{p-1}}(x_1 y_0 + x_0 y_1) \end{vmatrix} . \quad \text{(equation 3)}$$

if we define β as the sum of $x_i y_j$, when i+j=p−1, then $$\beta = \sum_{i+j=p-1} x_i y_i = x_{p-1}y_0 + x_{p-2}y_1 + \ldots + x_1 y_{p-2} + x_0 y_{p-1}.$$

We get equation 4, by dividing the value of $\alpha_{p-1}$ into two parts, i.e. β and the remaining portion (λ).

$$\alpha_{p-1} = \begin{vmatrix} \frac{1}{2}(x_{p-1}y_0 + \ldots x_0 y_{p-1}) + \\ \frac{1}{4}(x_{p-2}y_0 + \ldots + x_0 y_{p-2}) + \ldots + \\ \frac{1}{2^{p-1}}(x_1 y_0 + x_0 y_1) \end{vmatrix} = \left\lfloor \frac{1}{2}\beta + \lambda \right\rfloor \quad \text{(equation 4)}$$

Jou, J. M. et al. reported an equation of the fixed-width method of m=n=p. However, no restriction (i.e. m=n=p) is imposed on the m, n, p of equations 1~4.

Given a fixed β value, the number of 1 in the multiplicator or the multiplicand is as follows:

$$2\beta: \quad C(^n_\beta) * C(^{n-\beta}_1) * 2^0$$

$$2\beta + 1: \quad C(^n_\beta) * C(^{n-\beta}_1) * 2^1$$

$$2\beta + 2: \quad C(^n_\beta) * C(^{n-\beta}_1) * 2^2$$

...

$$2\beta + (n - \beta): \quad C(^n_\beta) * C(^{n-\beta}_{n-\beta}) * 2^{(n-\beta)}$$

Given a fixed β value, the maximum number of bits equal to 1 amongst the bits of a multiplicator (X, 100) or a multiplicand (Y,104) falls between 2β and (n+β). However, the distribution probability between 2β and (n+β) is not uniform.

Taking m=n=p as an example, it is defined that the probability of yielding a product of 1 after the multiplication of $x_i y_j$ (the product of one bit of a multiplicator and one bit of a multiplicand) is $P1(x_i y_j)$.

$$P1(x_i y_j) = \left[ \frac{\sum_{i=0}^{(n-\beta)} \left( \frac{2^i}{i!(n-\beta-i)!} \cdot (2\beta + i) \right)}{\left( \sum_{i=0}^{(n-\beta)} \frac{2^i}{i!(n-\beta-i)!} \right) \cdot 2n} \right]^2 \quad \text{(equation 5)}$$

Figure 7:
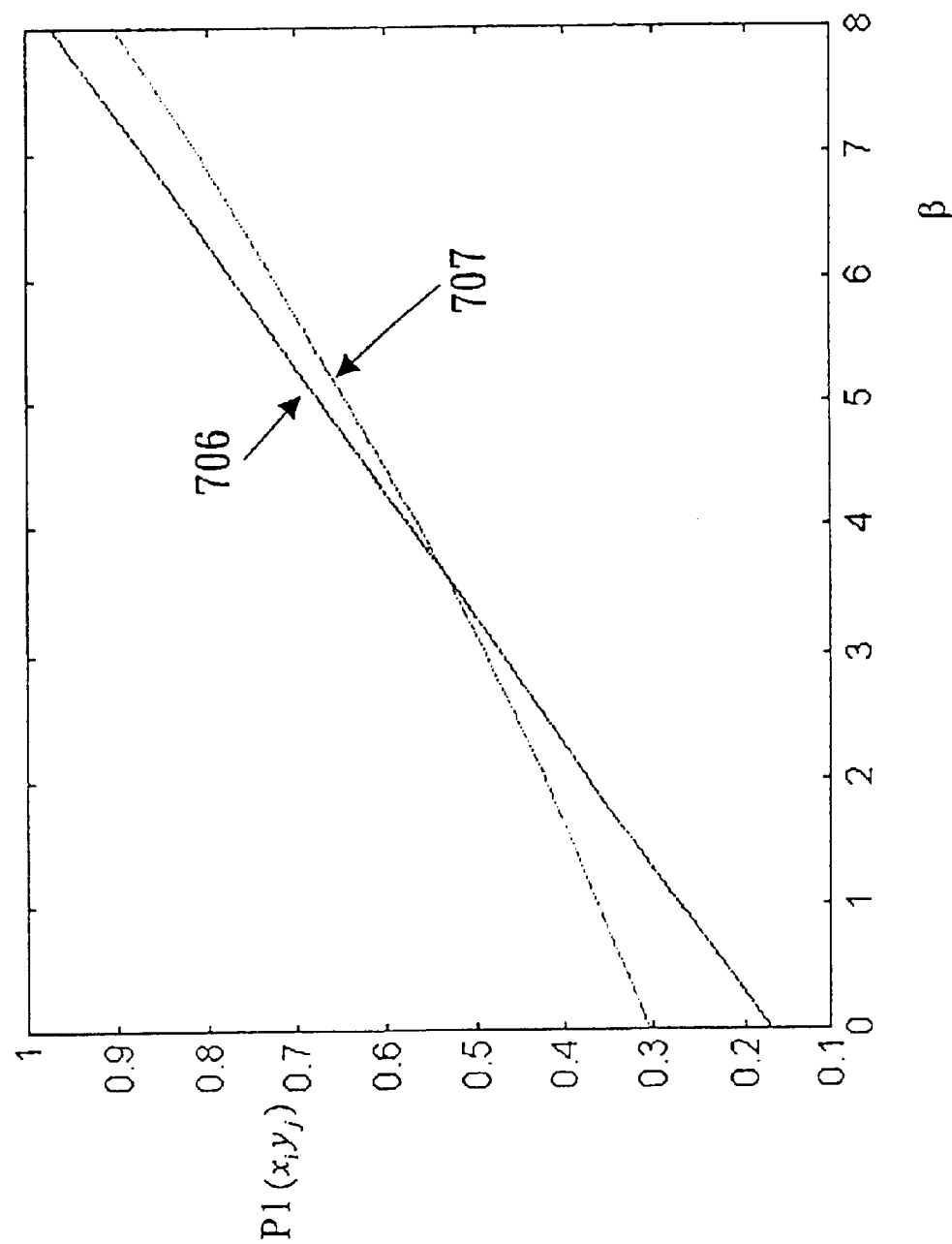
FIG. 7 is an illustration of the $P1(x_i y_j)$ and the regression curve taken, when n=8.

In this invention, we employ regression Line analytical method. Taking n=8 as an example, the $P1(x_i y_j)$ and regression curves are shown in FIG. 7. When n=8, 16, 32 & 64, the value of β/n+0.0712 will be the nearest curve to $P1(x_i y_j)$. If $P1(x_i y_j)$ is approximated as β/n+0.0712, then we can deduce that λ is $$\lambda = \left(\frac{\beta}{n} + 0.0712\right) * \left(\frac{n}{2} - 1\right) = \frac{\beta}{2} + 0.03556n - \frac{\beta}{n} - 0.07112. \quad \text{(equation 6)}$$

The operation described in equation 4 is to directly truncate the product terms. In this invention, if improvement is made by rounding off the product term, then $\alpha_{p-1}$ will be expressed in a completely new way as shown in equation 7.

$$\alpha_{n-1} = \left\lfloor \frac{\beta}{2} + \lambda + 0.5 \right\rfloor \cong \quad \text{(equation 7)}$$

$$\left\lfloor \frac{\beta}{2} + \frac{\beta}{2} + 0.03556n - \frac{\beta}{n} - 0.07112 + 0.5 \right\rfloor =$$

$$\beta + \left\lfloor -\frac{\beta}{n} + 0.03556n + 0.42888 \right\rfloor$$

In the frequently used number of n (4~16), $$\left\lfloor -\frac{\beta}{n} + 0.03556n + 0.42888 \right\rfloor$$

can be −1, 0 or +1, depending on the input. Table 2 shows the distribution of the probability of $\alpha_{n-1}$=β−1, β or β+1, where n is the bit number of a multiplicator and a multiplicand. This invention reveals that the greater the value of n the closer will $\alpha_{n-1}$ approximate β. For this reason, this invention can deduce a new compensation vector signal $\alpha_{n-1}$=β. The deduction process and the concept of the whole method remain the same, whether p is equal to n or not. In the case of m×n to m+n−p, the operation of product and the value of the compensation vector (a dotted line, 602) are as shown in FIG. 6.

It is quite easy to fulfill this innovative compensation signal. FIG. 8 shows an conventional Array multiplier of a 5×5 multiplier; and the dotted line in FIG. 8 indicates the operation to be removed by this invention. The dotted line (703) in FIG. 9 encloses the circuit for the intended compensation vector of this invention. Adding this compensation vector to the non-truncated portion will give rise to a new array structure, also known as reduced-width Array multiplier. The merit of this structure is that no other circuits are required to implement the compensation signal. FIG. 10 illustrates the method proposed by Jou, J. M. et al, in which an extra vertical column consists of AND-OR (AO) and AND gate circuit is added. The Array multiplier depicted in FIG. 6 and FIG. 8 applies to the number system with Sign/Un-sign Magnitude. Similar structure is found in the Array multiplier operated under the two complement system.

Take the 8×8 to 10 (P=6) multiplier, which is depicted in FIG. 11, as an example to illustrate the result of the operation of the known four methods and our invention. As shown in FIG. 11, an 8×8 will generate eight rows of numbers. However, for the purpose of simplicity, the number of rows is reduced to five, by setting the first four numbers of a multiplicator or a multiplicand as 0. As a result, product (801) represents the product of a complete multiplication; product 2 (802) is resulted from method 1, i.e. round-off; product 3 (803) is the results of method 2, i.e. truncation followed by computation; product 4 (804) arises from method 3, i.e. compensation with fixed value; product 5 (805) is a result of method 4, i.e. compensation with adaptive value; while product 6 (806) is created with this invention. Adding the value of $PD_{(p-1)}$ to $PD_p$ is exactly what is done by the compensating circuit described in this invention.

FIG. 12 illustrates the 8×8 Booth multiplication under the operation of a two's complement system. We use it to explain the usage of this innovative invention and the application of its compensation signal in Booth multiplier. The coder (901) and the scaler (902) operate in a way similar to the way in which they work in a conventional Booth multiplier. FIG. 13 shows the summand processing unit of the 8×8 Booth multiplier. FIG. 14 depicts the reduced-width low-error 8×8 to 8 Booth multiplier described in this invention. The result of the simulation performed in FIG. 9 and FIG. 14 will be discussed in details in the following section. In fact, after being processed by a coder (901), Booth can reduce the amount of numbers for addition from 8 to 4. The principle of the mechanism of its summand processing unit is similar to that of the traditional multiplication shown in FIG. 1.

EVALUATION OF PERFORMANCE

Table 3 contains an evaluation of the errors of the reduced-width, low-error Array multiplier and that presented by Jou, J. M. et al in 1999. As illustrated in Table 3, when the multiplicand and the multiplicator of a multiplier is 4, 6, 8, 10, 12, 14 or 16, the evaluation of all the possible input signals for average error ($\epsilon_{ave}$), the maximum error ($\epsilon_{max}$) and the signal-to-noise ratio (SNR) is performed as follows:

$$\varepsilon_{ave}(\%) = \frac{\text{average\_error}}{2^{2n} - 1} \times 100\%$$

$$\varepsilon_{max}(\%) = \frac{\text{max\_error}}{2^{2n} - 1} \times 100\%$$

$$SNR(\text{dB}) = 10 \log\left\{\frac{E[(\text{real product term})^2]}{E\{[\text{real product} - \text{the product of this invention}]^2\}}\right\}$$

where max_error denotes the maximum error between the real product and the product of this invention for all inputs. Average_error is calculated by the following equation $$\left(\sum_{1=0}^{2^{2n}} |\text{real product} - \text{the product of the invention}|\right) \Big/ 2^{2n}.$$

The average error, maximum error and signal-to-noise ratio of this invention are all better than the results of Jou, J. M. et al. As also explained in the report of Jou, J. M. et al., their results are better than the results obtained by other methods. Hence, the performance of this method surpasses that of any known method. As far as speed and the complexity of circuit are concerned, this invention uses one column of AND-OR (AO) less than that of Jou, J. M. et al. Thus this invention has smaller area and faster operation speed.

We implement the 16×16 to 16 reduced-width Array multiplier by using the standard cell library provided by Avant Corporation. The results show that the SNR is 90.55 dB and the number of logical gates is reduced by 48% as compared to the conventional Array multiplier.

Table 4 shows a comparison of the operation of an n×n to n Booth multiplier when a multiplicator and a multiplicand is 4, 6, 8, 10, 12, 14 or 16 respectively. The architecture used in the reduced-width Booth multiplier is like that shown in FIG. 14, and FIG. 16 shows the detailed circuit for operating the summand.

In Table 4, the left hand side shows the data of this invention. The data on the right hand side of Table 4 is the results of (n+1) method. In this method, one more column ((n−1)th) of bits in the summand is taken like that shown in FIG. 15 for 8×8 to 9 case. The detail array structure for the operation of summand is shown in FIG. 17.

According to Table 4, there is an increase of 3 dB (n>8) and a 8% reduction of logical gate number in this method as compared to the result of (n+1) method in the instance of 16×16 to 16.

The improvement is even more striking, i.e. a 46% reduction of logical gate number and a SNR of 76.64 dB, as compared to the result of the original Booth multiplier. Therefore, the design of the multiplier in this invention is excellent.

To sum up, the invention has the features of creativity, novelty and ingenuity. Although the invention uses just a few better preparation examples disclosed as above, its application will not be limited to them. Anyone who is familiar with the techniques disclosed are able to amend and/or apply the techniques partially or totally without going beyond the invention's spirit and coverage. Thus, the protection coverage of the invention is determined by the description stated, the drawings and the information listed in the tables below, which are limited and defined only by the appended claims.

TABLE 1

The coding method of the Booth multiplier

| Yj + 1 | Yj | Yj − 1 | Action |
|---|---|---|---|
| 0 | 0 | 0 | No |
| 0 | 0 | 1 | Add to multiplicand |
| 0 | 1 | 0 | Add to multiplicand |
| 0 | 1 | 1 | Add to 2Xmultiplicand |
| 1 | 0 | 0 | Subtract from 2Xmultiplicand |
| 1 | 0 | 1 | Subtract from multiplicand |
| 1 | 1 | 0 | Subtract from multiplicand |
| 1 | 1 | 1 | No |

TABLE 2

The probability distribution curve of $\alpha_{n-1} = \beta - 1$, $\beta$ or $\beta + 1$ with different bit numbers (n)

| $\alpha_{n-1}$ n | $\beta - 1$ | $\beta$ | $\beta + 1$ | Average |
|---|---|---|---|---|
| 4 | 5.078E−2 | 9.496E−1 | 0 | β−0.050 |
| 6 | 3.760E−2 | 9.624E−1 | 0 | β−0.038 |
| 8 | 4.227E−3 | 9.958E−1 | 0 | β−0.004 |
| 10 | 4.158E−4 | 9.956E−1 | 0 | β−4.0E−3 |
| 12 | 2.205E−6 | 1 | 0 | β−2.2E−6 |
| 14 | 1.602E−7 | 1 | 0 | β−1.6E−7 |
| 16 | 2.328E−10 | 1 | 0 | β |

TABLE 3

Evaluation of the Array multiplier's performance

| | $\epsilon_{ave}$ (%) | | $\epsilon_{max}$ (%) | | SNR (dB) | |
|---|---|---|---|---|---|---|
| N | this invention | Jou, J. M. et al. | this invention | Jou, J. M. et al. | this invention | Jou, J. M. et al. |
| 4 | 2.03E−2 | 2.83e−2 | 3.34e−2 | 8.23e−2 | 21.33 | 18.75 |
| 6 | 5.89e−3 | 9.10e−3 | 2.17e−2 | 2.61e−2 | 32.95 | 29.65 |
| 8 | 1.62e−3 | 2.60e−3 | 6.73e−3 | 7.86e−3 | 41.96 | 38.40 |
| 10 | 4.35e−4 | 7.03e−4 | 2.01e−3 | 2.29e−3 | 55.80 | 52.20 |
| 12 | 1.14e−4 | 1.80e−4 | 5.83e−4 | 6.54e−4 | 67.41 | 63.31 |
| 14 | 4.28e−5 | 6.01e−5 | 1.62e−4 | 2.15e−4 | 78.22 | 75.13 |
| 16 | 9.10e−6 | 2.48e−5 | 5.15e−5 | 5.49e−5 | 90.55 | 87.60 |

TABLE 4

Evaluation of the Booth multiplier's performance

| | $\epsilon_{ave}$ (%) | | $\epsilon_{max}$ (%) | | SNR (dB) | |
|---|---|---|---|---|---|---|
| N | this invention | (N + 1)bits | this invention | (N + 1)bits | this invention | (N + 1)bits |
| 4 | 1.83E−02 | 1.36E−02 | 5.86E−02 | 4.30E−02 | 1.11E+01 | 1.32E+01 |
| 6 | 5.67E−03 | 6.22E−03 | 2.08E−02 | 1.83E−02 | 2.14E+01 | 2.10E+01 |
| 8 | 1.63E−03 | 2.28E−03 | 6.76E−03 | 6.52E−03 | 3.22E+01 | 3.02E+01 |
| 10 | 4.55E−04 | 7.52E−04 | 2.08E−03 | 2.12E−03 | 4.33E+01 | 4.00E+01 |
| 12 | 1.24E−04 | 2.34E−04 | 6.18E−04 | 6.51E−04 | 5.35E+01 | 5.04E+01 |
| 14 | 3.29E−06 | 6.68E−05 | 1.79E−04 | 1.93E−04 | 6.40E+01 | 6.13E+01 |
| 16 | 8.72E−08 | 1.91E−05 | 5.18E−05 | 5.74E−05 | 7.66E+01 | 7.30E+01 |

What is claimed is:

1. A reduced-width low-error multiplier method, for use in a communication system for making proper compensation in accordance with values of a multiplier and a multiplicand, comprising the steps of:

Determining whether the multiplicand X has a bit length of m and is denoted by $X_{m-1} \ldots X_i \ldots X_0$, and whether a multiplier Y has a bit length of n and is denoted by $Y_{n-1} \ldots Y_j \ldots Y_0$ then;

When the multiplicand X has a bit length of m and is denoted by $X_{m-1} \ldots X_i \ldots X0$, and when the multiplier Y has a bit length of n and is denoted by $Y_{n-1} \ldots Y_j \ldots Y0$, establishing the product term PD, as having (m+n−p) bits and denoted by $PD_{m+n-1} \ldots PD_n \ldots PD_p$ where p is a bit length of a product term to be removed, I is the ith bit of a multiplicand X, and j is the jth bit of the multiplicator Y;

determining the compensation signal β, according to the equation:

$$\beta = \sum_{i+j=p-1} x_i y_j = x_{p-1} y_0 + x_{p-2} y_1 + \ldots + x_1 y_{p-2} + x_0 y_{p-1}$$

where i+j=p−1 and i varies from 0 to p−1.

2. The method of claim 1, wherein hardware required for operation is reduced and speed of operation is increased by directly removing an operation of product terms of lower bits.

3. The method of claim 1, wherein a compensation vector is added to a preceding row, according to a direction of an arrow.

4. The multiplier of claim 1, further comprising a Booth coder, a scaler, Full-Adders, a Half-Adder, and a compensation circuit; wherein the Booth Coder performs coding, the scaler performs a transposition, and the coding reduces a number of addition rows dependent upon a bit length of a product term to be removed.

5. The multiplier of claim 4, wherein the compensation signal is directly added to the Full-Adders and Half-Adders which are used to sum up the values in the summand.

6. The method of claim 1, wherein a reduced-width low error-multiplication operation is created by adding a value of β directly to a vertical column at an end of a right side of a summand.

7. The method of claim 1, wherein an amplitude of the compensation signal varies with the multiplier and the multiplicand.

8. The method of claim 1, wherein a bit length of a product term to be truncated is changeable.

9. The multiplier of claim 4, wherein an addition of three bit numbers with a same category weight in the Full-Adders results in a bit of carry and a sum.

10. The multiplier of claim 4, wherein an addition of two bit numbers with a same category weight in the Half-Adder yields a carry and a sum.

11. The multiplier of claim 4, wherein a compensation signal β is a bit of a (p−1) vertical column of a summand, where p is a bit length of a product term to be removed.

12. The multiplier of claim 4, wherein the Full-Adders and the Half-Adder operate together to add up volumes of the addition rows.

13. The multiplier of claim 4, wherein a compensation vector is added to an input of the Full-Adders at an end of a right side of a summand.

14. A Reduced-Width Low-Error Array Multiplier, comprising Full-Adders, a Half-Adder, AND gates and a compensating circuit; wherein said Full-Adders take three input bits of a same weight and generate a sum and carry bits; Half-Adder takes two input bits of the same weight and generates a sum and carry bits; wherein said AND gates are used to generate $x_i y_j$ and a compensation signal is β, is computed in accordance with the following equation:

$$\beta = \sum_{i+j=p-1} x_i y_j = x_{p-1} y_0 + x_{p-2} y_1 + \ldots + x_1 y_{p-2} + x_0 y_{p-1}$$

wherein i+j=p−1, p is a bit length of a product term to be removed, and j varies from 0 to p−1.

15. The multiplier of claim 14, wherein no other circuits are required to implement a compensation vector.

16. The multiplier of claim 14, wherein one of a new array and a reduced-width array multiplier is created by adding a compensation vector to an input of the Full-Adders at an end of a right side of a summand.

* * * * *